(12) United States Patent
Heyder et al.

(10) Patent No.: US 10,787,223 B2
(45) Date of Patent: Sep. 29, 2020

(54) CLAMPING ELEMENT FOR FASTENING COMPONENTS TO BICYCLE HANDLEBARS, AS WELL AS A COMPONENT WITH SUCH CLAMPING ELEMENT

(71) Applicant: Canyon Bicycles GmbH, Koblenz (DE)

(72) Inventors: Daniel Heyder, Alfter (DE); Julius Thorwart, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 0 days.

(21) Appl. No.: 16/181,735

(22) Filed: Nov. 6, 2018

(65) Prior Publication Data

US 2019/0135374 A1    May 9, 2019

(30) Foreign Application Priority Data

Nov. 7, 2017   (DE) .................... 20 2017 005 757 U

(51) Int. Cl.

| B62L 3/02 | (2006.01) |
|---|---|
| B62K 21/12 | (2006.01) |
| B62K 23/06 | (2006.01) |
| B62K 11/14 | (2006.01) |
| F16B 2/10 | (2006.01) |
| B62J 11/00 | (2020.01) |
| F16B 2/06 | (2006.01) |
| F16M 13/02 | (2006.01) |

(52) U.S. Cl.
CPC ................ B62L 3/02 (2013.01); B62J 11/00 (2013.01); B62K 11/14 (2013.01); B62K 21/125 (2013.01); B62K 23/06 (2013.01); F16B 2/065 (2013.01); F16B 2/10 (2013.01); F16M 13/02 (2013.01)

(58) Field of Classification Search
CPC . B62K 21/12; B62L 3/02; B62H 23/06; B62J 11/00; F16B 7/1418; F16B 2/10; F16B 2/065
See application file for complete search history.

(56) References Cited

U.S. PATENT DOCUMENTS

| 4,005,613 | A | 2/1977 | Kaufman et al. | |
|---|---|---|---|---|
| 5,988,573 | A | 11/1999 | Mueller | |
| 6,896,438 | B1 * | 5/2005 | Chen | B62K 19/36 403/290 |
| 9,783,258 | B1 * | 10/2017 | Elwell | B62L 3/06 |

(Continued)

FOREIGN PATENT DOCUMENTS

| CN | 204979000 U | 1/2016 |
|---|---|---|
| DE | 102014224535 A1 | 6/2016 |

(Continued)

*Primary Examiner* — Luis A Gonzalez
(74) *Attorney, Agent, or Firm* — The Webb Law Firm

(57) ABSTRACT

A clamping element for fastening bicycle components, in particular brake/gearshift units, to bicycle handlebars, such as a racing bicycle handlebar, includes a first clamping part and a second clamping part. The first clamping part serves to be connected with the bicycle component, e.g. by a screw. The second clamping part is releasably connected with the first clamping part. Thereby, it is possible to configure the clamping element such that the clamping element is also suited for non-round handlebars and/or can be arranged in closed regions of a handlebar.

16 Claims, 4 Drawing Sheets

(56) References Cited

U.S. PATENT DOCUMENTS

| | | | |
|---|---|---|---|
| 2004/0183273 A1 | 9/2004 | French | |
| 2007/0258758 A1* | 11/2007 | Ho | B62J 11/00 |
| | | | 403/398 |
| 2010/0224740 A1* | 9/2010 | Hirose | B60T 7/102 |
| | | | 248/124.2 |
| 2010/0307281 A1* | 12/2010 | Hsu | B62K 23/06 |
| | | | 74/502.2 |
| 2013/0277162 A1* | 10/2013 | Nago | B62K 23/06 |
| | | | 188/344 |
| 2014/0252746 A1 | 9/2014 | Talavasek et al. | |
| 2016/0311497 A1 | 10/2016 | Wagner | |
| 2019/0040885 A1* | 2/2019 | Minto | F16B 2/185 |

FOREIGN PATENT DOCUMENTS

| | | |
|---|---|---|
| DE | 202015005798 U1 | 11/2016 |
| FR | 952533 | 11/1949 |
| GB | 2028411 A | 3/1980 |

* cited by examiner

CLAMPING ELEMENT FOR FASTENING COMPONENTS TO BICYCLE HANDLEBARS, AS WELL AS A COMPONENT WITH SUCH CLAMPING ELEMENT

CROSS-REFERENCE TO RELATED APPLICATION

This application claims priority to German Utility Model Application No. 20 2017 005 757.3 filed Nov. 7, 2017, the disclosure of which is hereby incorporated in its entirety by reference.

BACKGROUND OF THE INVENTION

Field of the Invention

The invention relates to a clamping element for fastening components to bicycle handlebars. The invention particularly relates to a clamping element for fastening components, such as brake lever and gearshift lever units, to bicycle handlebars, in particular to racing bicycle handlebars. The invention further relates to such a bicycle component with a clamping element for fastening to bicycle handlebars, in particular to racing bicycle handlebars.

Description of Related Art

Bicycle components, such as e.g. brake levers, gearshift levers and other components, are often fastened to bicycle handlebars by means of clamping elements, such as clamping collars. In particular brake lever and gearshift lever units, such as often implemented in racing bicycles, in which the gearshift lever is integrated in the brake lever, are fastened to bicycle handlebars using collar-like clamping elements. For fastening, these closed collar-like clamping elements have to be slipped onto the open handlebar end and have to be pushed to the corresponding position where they are then clampingly fixed on the bicycle handlebar. Such closed clamping element of collar-like design particularly have the disadvantage that they do not allow e.g. a fastening to handlebars of non-round cross section. Further, such closed clamping elements cannot be used in closed parts of handlebars, since it is not possible to slip them over the handlebar end. Moreover, it is not possible to retrofit these clamping elements, if a grip tape or a grip element is already provided on the handlebar ends.

SUMMARY OF THE INVENTION

It is an object of the invention to provide a clamping element that can also be used with different handlebar cross sections or with closed types of handlebars. Further, it also is an object of the invention to provide a corresponding bicycle component.

These objects are achieved, according to the invention, with a clamping element, as well as with a bicycle component.

The clamping element of the invention comprises a first clamping part and a second clamping part. The first clamping part is configured to be connected, in particular directly, with the bicycle component. Here, the connection is preferably made such that the first clamping part comprises a connecting part for receiving a clamping means, such as a screw. For this purpose, the connecting part may have a thread into which the screw may be screwed. For the connection with the component, the same preferably comprises a holding part which may also be connected with the clamping means. Such a holding part may e.g. comprise an opening through which the screw passes so that by screwing the screw into the thread of the connecting part, it is possible to connect the first clamping part with the component and to thus fix the component to the bicycle handlebar.

The second clamping part of the clamping element of the invention is releasably connected with the first clamping part. Due to this releasable connection between the two clamping parts, it is possible to arrange the clamping element of the present invention also in a closed region of closed handlebars, since it is no longer necessary to slip the clamping element onto the handlebar over the end thereof. Further, it is also possible e.g. to fix a component by means of the clamping element of the present invention after the handlebar end has already been provided with a grip tape or another grip element.

In the mounted state the first and second clamping elements preferably form an opening closed in itself. Thus, in the mounted state, the handlebar is arranged in this opening or is completely enclosed by the two clamping parts.

In a preferred embodiment of the clamping element of the present invention it is possible that the opening formed by the two clamping parts has a non-round inner contour. Thereby, it is possible to arrange the clamping elements also on handlebars having a non-round cross section. This is particularly advantageous, since this allows for an aerodynamic and/or ergonomic design of these regions of a handlebar as well, due to the fact that not only round outer contours can be selected.

In another embodiment, the two clamping elements may preferably also be configured to have a round inner contour. Using the element, which according to the invention consists of at least two clamping parts, it is possible to mount the same also in closed regions of the handlebar, since the clamping element of the present invention need not be slipped over the handlebar end.

In a preferred development, an adapter element is provided in addition. In the mounted state, the adapter element is arranged in the opening formed by the two clamping parts. The adapter element serves to adapt the outer contour of the handlebar to the inner contour of the opening formed by the two clamping parts. For example, when using a clamping element with a circular opening in the mounted state, this clamping element can be used on a handlebar having a non-round outer contour. In this case, an adapter element is used that is shaped such that the outer contour of the handlebar in combination with the adapter element forms a circular contour. Thus, the adapter element serves to enable the use of a clamping element with a round inner contour also for a handlebar with a non-round outer contour. Thereby, it is possible in particular to use one and the same clamping element for handlebar outer contours of different shapes, since all that is necessary is to provide a correspondingly shaped adapter element.

Likewise, adapter elements may also be provided for a clamping element of the present invention which has a non-round inner contour, so that, again, an adaptation of the e.g. round outer contour of the handlebar to the inner contour of the clamping element is obtained by the adapter element.

In a preferred embodiment, the adapter element comprises an in particular rigid inner part. In the mounted state, the inner part is preferably arranged completely in the opening formed by the in particular two clamping parts. Thereby, clamping forces may be transmitted uniformly in an advantageous manner by the clamping element onto the outer contour of the handlebar and the adapter element.

Further, it is preferred that the adapter element has at least one, in particular two outer parts that adjoin the inner part. In the mounted state, the at least one outer part is arranged outside the opening formed by the clamping element. In this manner, an additional support and force transmission from the clamping element onto the outer contour of the handlebar can be effected via the adapter element. Here, it is preferred that the at least one outer part is elastic or flexible, so that, in the mounted state, the outer part contacts the outer side of the handlebar by as large a surface as possible. For this purpose, the at least one outer part preferably comprises a plurality of lamellae. In this case, in a preferred embodiment, the lamellae do not extend in parallel, in particular perpendicular to the direction of deformation of the corresponding outer part.

In a preferred development of the invention, the first and/or the second clamping part are respectively mirror-symmetrical in themselves. This facilitates assembly, since it is not possible to arrange the corresponding clamping parts incorrectly. Of course, such a mirror-symmetrical design is feasible only if the handlebar also is of a symmetrical design in the region where the clamping element is to be arranged. Preferably, the inner contour of the opening formed by the two clamping parts is formed such that it corresponds to the outer contour of the handlebar in the corresponding region.

Although it is preferred that the clamping element only comprises a first and a second clamping part, it is, of course, also possible for the clamping element to comprise a third or even further clamping parts. However, this is disadvantageous in that the individual clamping parts have to be connected to one another and that great forces have to be transmitted in particular in these regions. In this regard, it is particularly preferred that the clamping element only comprises two clamping parts.

Preferably, the first or the second clamping part comprises two opposite arms. These surround the handlebar in the mounted state for at least one half of the handlebar's circumference in the region in which the clamping element is to be mounted. The two arms thus form at least half the opening formed by the two clamping parts. In particular, the two arms form two thirds of this opening.

It is particularly preferred that the first clamping part has two such arms, with the first clamping part further being connected with the connecting part or comprising the connecting part. The connecting part serves in particular for the connection with the brake/gearshift lever unit, specifically a housing or a holding element of the brake/gearshift lever unit. The brake lever is typically fastened thereto in a pivotable manner. With modern brake/gearshift lever units, electronic units or the like may possibly be arranged in this housing, beside hydraulic lines or Bowden cables. In particular, this has the result that the installation space inside this housing is very small. Further, the installation space varies among the different manufacturers. Due to the provision of two opposite arms that are a part of the first clamping part, the connection with a second clamping part can be shifted to the outer side and, as such, is no longer required to be provided inside the housing or inside the brake unit. Rather, in such a particularly preferred embodiment, a connection of the two clamping parts can be effected in a much simpler manner. The connection of the two clamping parts is thus made, in a preferred embodiment, in the mounted state outside the brake unit, in particular outside the housing of the brake unit.

In a preferred embodiment, the connection of the in particular two clamping parts may be effected by means of bolts, i.e. preferably two bolts. In this regard, it is preferred that, for the connection by means of a bolt, one of the two clamping parts comprises two lugs each having a bolt hole. In a preferred development, these lugs engage around an end piece of the other clamping part. Thus, two lugs of the other clamping part engage around or over the end piece of the one clamping part. The end piece has an opening which in the mounted state is aligned with the bolt holes of the two lugs so that, for connection, a bolt can be inserted in a simple manner. This may be a locking bolt, since, due to the clamped fixation and the forces occurring, this bolt is prevented from slipping out. However, it may also be a threaded bolt so that, in a preferred embodiment, one of the bolt holes has a thread or the bolt is inserted through the same in the manner of a screw and is locked using a nut.

In a second, alternative embodiment, the—in a preferred embodiment—two clamping parts are connected in such a manner that the first clamping part has lugs abutting on the inner side of the second clamping part, in particular on inner sides of arms of the second clamping part. Here, the connection is preferably made exclusively using the friction forces occurring, with a form-fitting connection by means of bolts not being required in this embodiment.

Preferably, the inner sides, on which the lugs of the first clamping part abut, face each other, the distance of these two inner sides from each other tapering outward. This tapering thus starts from the handlebar top surface outward, when in the mounted state. In this case, the assembly is preferably effected such that the first clamping part, which preferably also comprises the first connecting part, e.g. with a thread, is drawn outward by means of a clamping means such as a screw. Thereby, on the one hand, a connection is made with the holding part of the bicycle component to be fixed and, on the other hand, a clamping, frictional connection of the lugs with the inner sides of the two arms is obtained. In order to prevent the two arms from being pushed apart in an undesired manner, it is preferred that the lugs comprise a protrusion that engages in at least one recess of the first clamping part, in particular an arm of the first clamping part. It is likewise possible that the corresponding protrusion is provided at the second clamping part, e.g. at the arms, and engages in a recess provided at the lugs of the first clamping part. Due to the preferably two protrusions that engage in two recesses, it is possible to absorb tangential and radial forces and it is avoided that the two arms of the—in this embodiment—second clamping part are pushed apart. The corresponding recesses and protrusions preferably extend over the entire width of the two clamping parts.

In another preferred embodiment, the first or the second clamping part comprises an adjusting nose which, in the mounted state, engages in an adjusting opening respectively provided in the other clamping part. Thereby, a relative displacement of the two clamping parts in the longitudinal direction, i.e., in the mounted state, parallel to the longitudinal direction of the handlebar, is avoided.

In a particularly preferred embodiment, both clamping parts are made of high-strength material. The material preferably has a yield strength $R_{p\ 0.2} > 1000$ N/mm², in particular $R_{p\ 0.2} > 1100$ N/mm². The tensile strength of the high-strength material used is preferably $R_m > 1200$ N/mm², in particular $R_m > 1400$ N/mm².

It is further preferred to produce the two clamping parts of the clamping element of the invention by laser sintering, wire erosion or CNC milling. A production using MIM (Metal Injection Molding) Processes is particularly preferred.

The invention further relates to a bicycle component for fastening to a bicycle handlebar, comprising a clamping element as described above. The bicycle component preferably is a brake/gearshift lever unit. The same comprises a housing for receiving a lever mechanism, as well as for a rotatable and/or pivotable fastening of a brake lever, as well as of a gearshift lever. Further, the housing is connected with a holding part preferably arranged inside the housing. The holding part serves to receive a clamping means such as a screw. For the fixation of the bicycle component on the handlebar, the clamping means is connected with the connecting part of the first clamping part of the clamping element.

The invention will be explained in more detail hereinafter with reference to a preferred embodiment and to the accompanying drawings.

DESCRIPTION OF THE INVENTION

Figure 1:
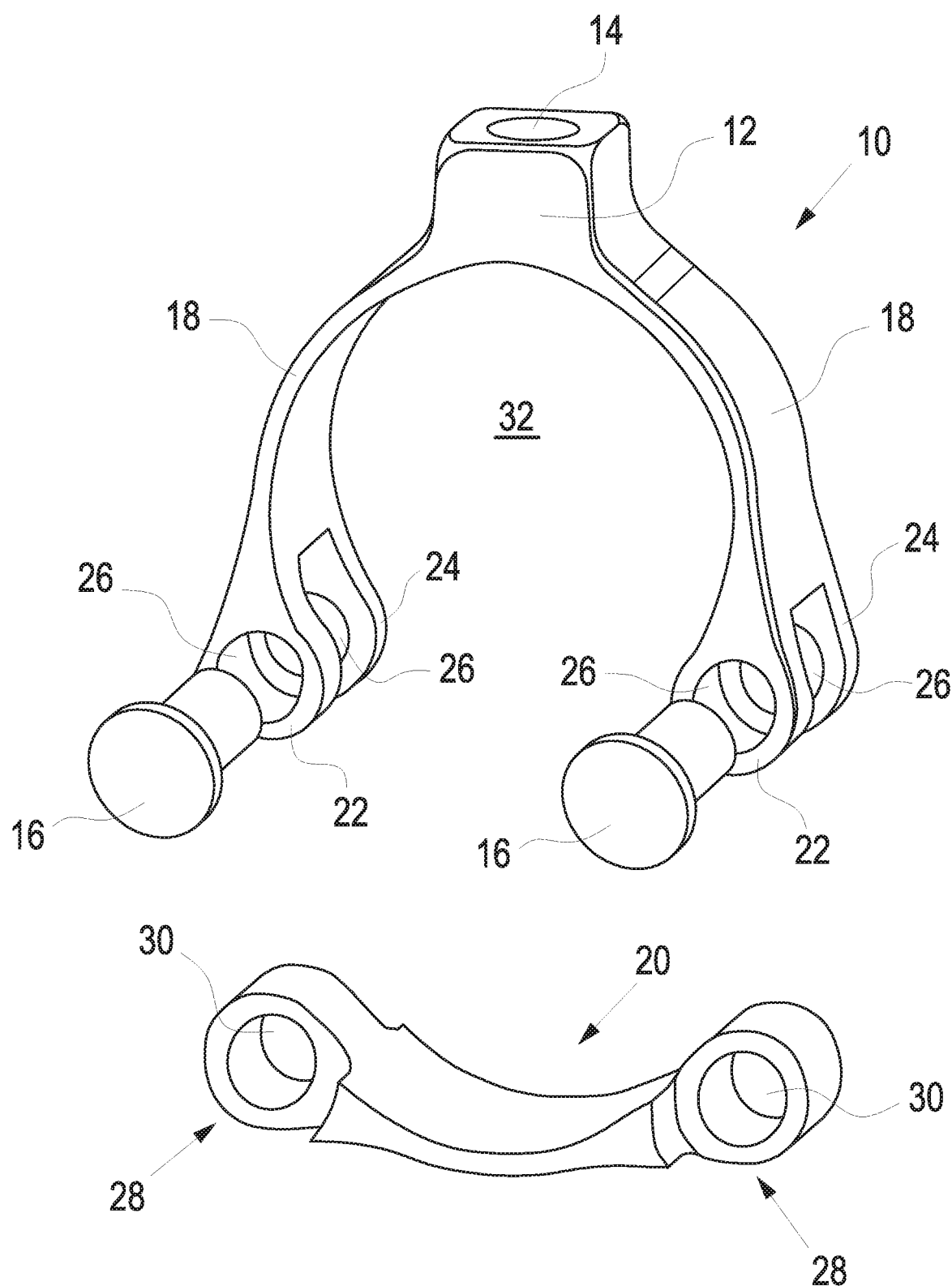
FIG. 1 is a schematic perspective view of a first preferred embodiment of a clamping element.

In the first preferred embodiment illustrated in FIG. 1, the clamping element comprises a first clamping part 10, as well as a second clamping part 20. The first clamping part 10 comprises a connecting part 12. The connecting part 12 has an opening 14 provided with a thread. A clamping means, such as a screw, can be screwed into the opening 14. This clamping means serves for the connection with a holding part of a bicycle component to be fastened.

Two bolts 16 are provided for connecting the first clamping part 10 with the second clamping part 20. For a fastening by means of bolts 16, two opposing arms 18 of the first clamping part 10 each have two lugs 22, 23 at their ends, which lugs are arranged facing each other and are preferably formed integrally with the arms 18.

Both lugs 22, 24 have a bolt hole 26, respectively, the two bolt holes 26 respectively being coaxial with each other. The second clamping part 20 has an opening 30 in the two end parts 28, respectively. For the mounting of the two clamping parts 10, 20, the end parts 28 are inserted between the two lugs 22, 24 so that the bolt holes 26 are aligned with the openings 30. Then, the two bolts 16 are inserted for fixation.

In the mounted state, i.e. when the first clamping part 10 is connected with the second clamping part 20 by means of the bolt 16, the two clamping parts 10, 20 form an opening 32. In a preferred embodiment, the same has a non-round inner contour which is preferably adapted to the outer contour of that region of the handlebar in which the bicycle component is to be fixed.

Figure 2:
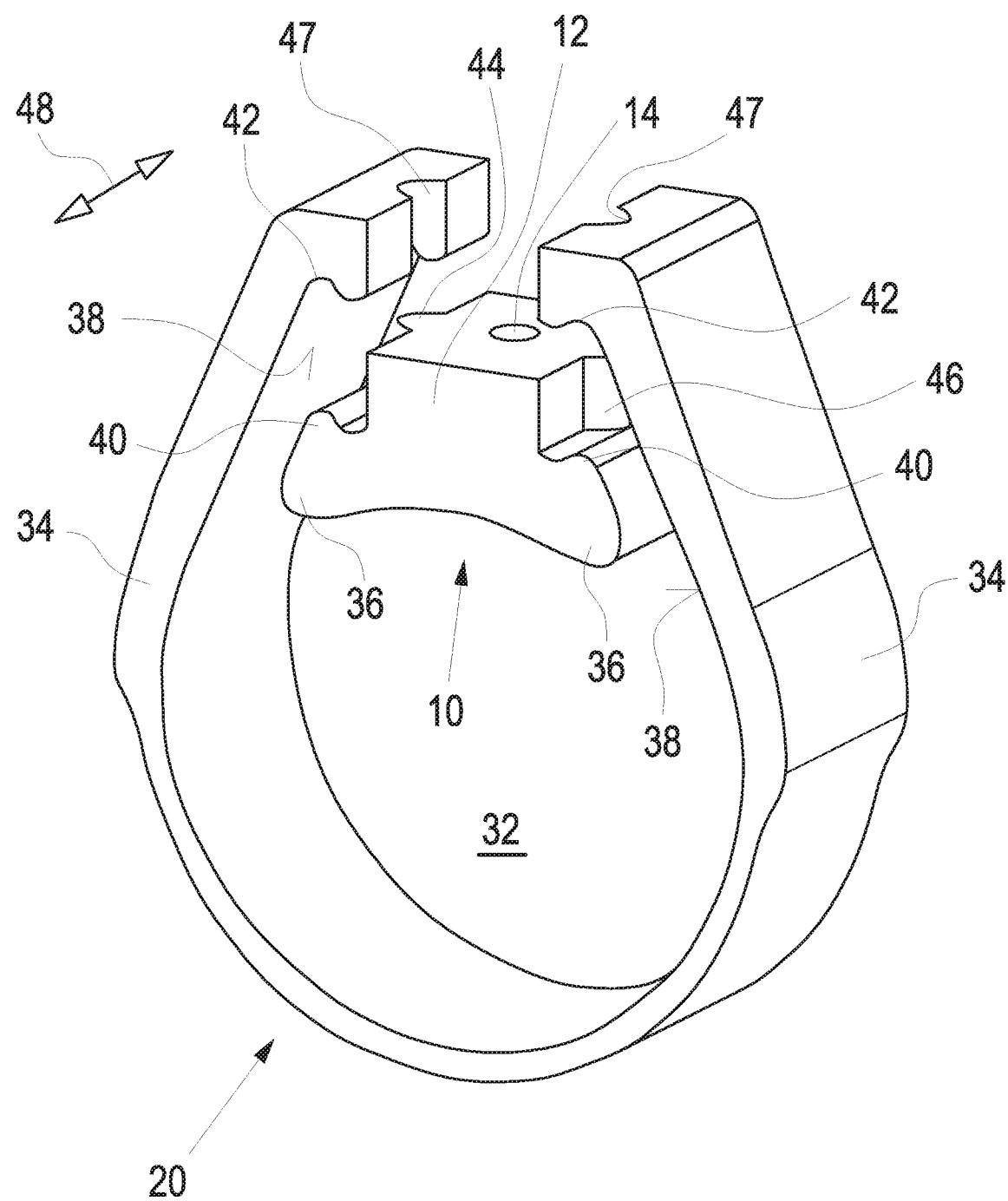
FIG. 2 is a schematic perspective view of a second preferred embodiment of a clamping element according to the invention.

In the second preferred embodiment illustrated in FIG. 2, similar parts are identified by the same reference numerals. Thus, a first clamping part 10 also comprises a connecting part 12 which has an opening 14 provided in particular with a thread. In this embodiment, the second clamping part 20 has two opposing arms 34.

In this embodiment, the connection of the two clamping parts 10, 20 is made by frictional engagement. For this purpose, the first clamping part 10 has two opposing lugs 36. In the mounted state, these abut on inner sides 38 of the two arms 34 of the second clamping part 20, which inner sides also oppose each other.

In a preferred embodiment, the two lugs 36 comprise two protrusions 40 in order to prevent the two arms 34 from being pushed apart. In the mounted state, the protrusions 40 engage in recesses 42 provided in the upper end regions of the two arms 34.

In the embodiment illustrated in FIG. 2, two opposing adjusting noses 46 are provided at outer sides of the connecting part 12, which noses engage in adjusting openings 47. The adjusting openings 47 are arranged at the opposing ends of the two arms 34. Due to the adjusting noses 46 engaging in the adjusting openings 47, a displacement of the two clamping parts 10, 20 in the longitudinal direction 48 is prevented.

Figure 3:
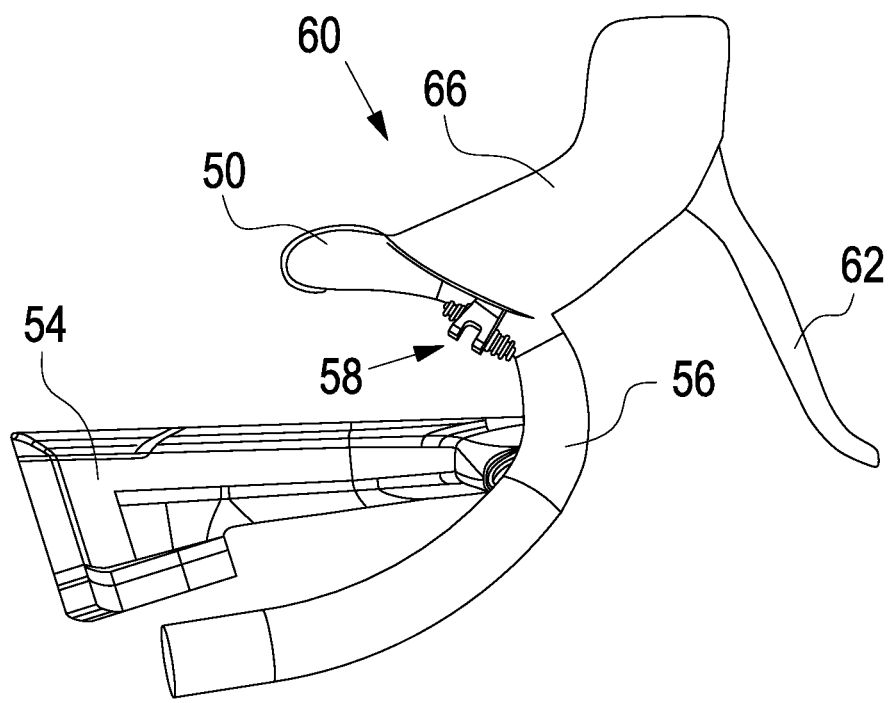
FIG. 3 is a schematic side view of a bicycle handlebar with a brake/gearshift lever unit mounted thereon.
Figure 4:
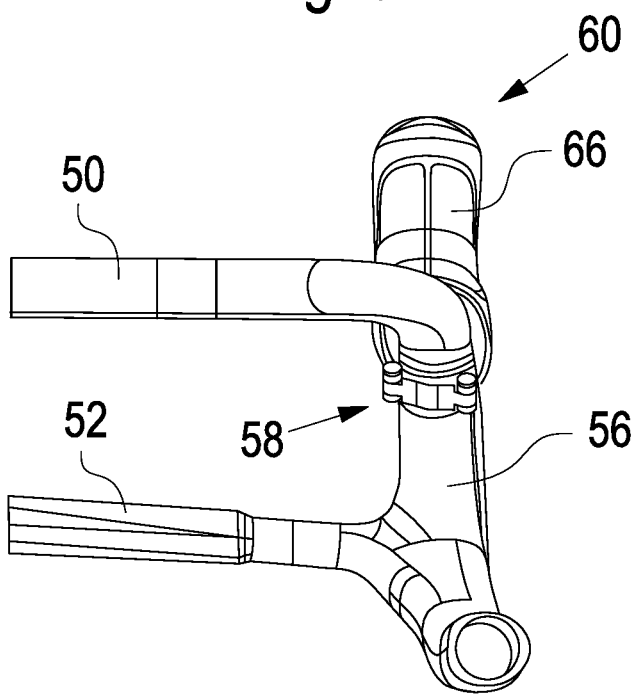
FIG. 4 is a schematic rear view of the brake/gearshift lever unit of FIG. 3, mounted on the bicycle handle bar.

FIGS. 3 and 4 illustrate a bicycle component in the form of a brake/gearshift unit in combination with the clamping element illustrated in FIG. 1 in the mounted state.

The racing bicycle handlebar has an upper crossbar 50, as well lower crossbar 52 substantially parallel thereto. The lower crossbar 52 is connected with the stem 54 or, as in the embodiment illustrated, is formed integrally therewith. In a closed region 56 of the handlebar, the clamping element 58 of the present invention with the two clamping parts 10, 20 is arranged. The clamping element 58 serves to clampingly hold a brake/gearshift unit 60. The same comprises at least one correspondingly pivotable and rotatable lever 62 with which, on the one hand, a braking operation and, on the other hand, a shifting operation can be performed. The lever 62 is pivotably and rotatable fixed to a housing 66. Further, a corresponding gearshift mechanism is arranged in the housing 66. Moreover, a holding part (FIG. 5) is arranged in the housing 66, which is e.g. designed as a web 64. The same has an opening or a throughbore through which a screw can be inserted from above. For fixation, this screw 68 is then screwed into the opening 14 of the connecting part 12 of the first clamping part 10.

Figure 5:
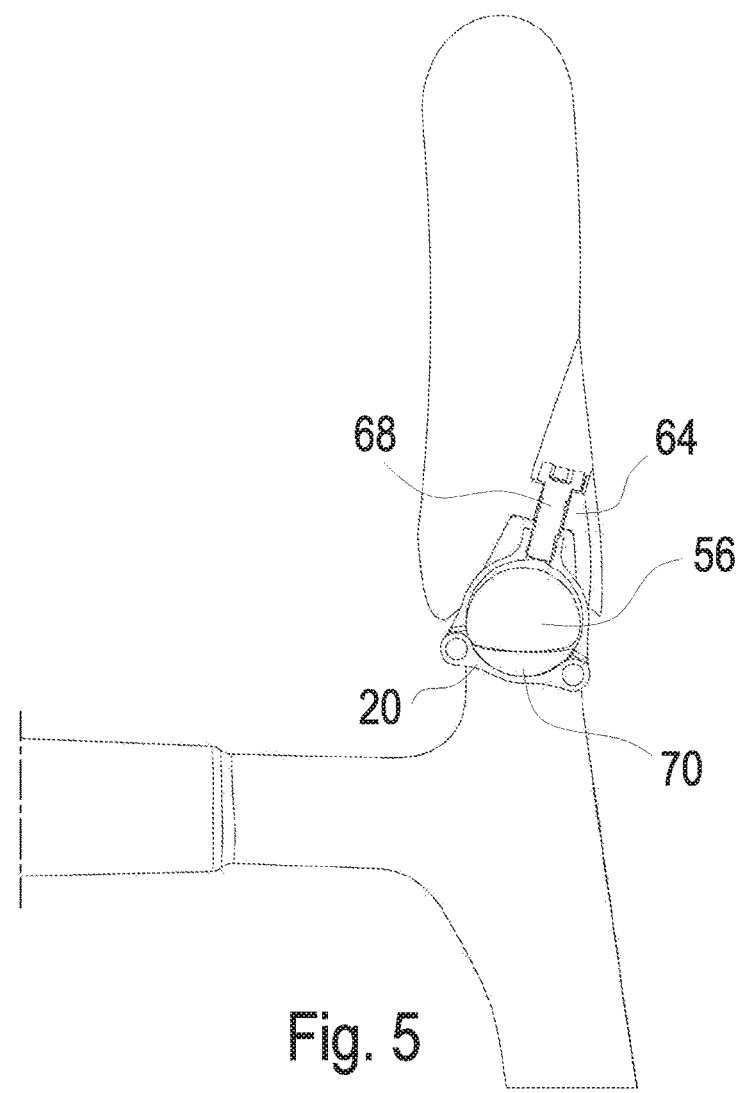
FIG. 5 is a schematic sectional view of the mounted clamping element.
Figure 6:
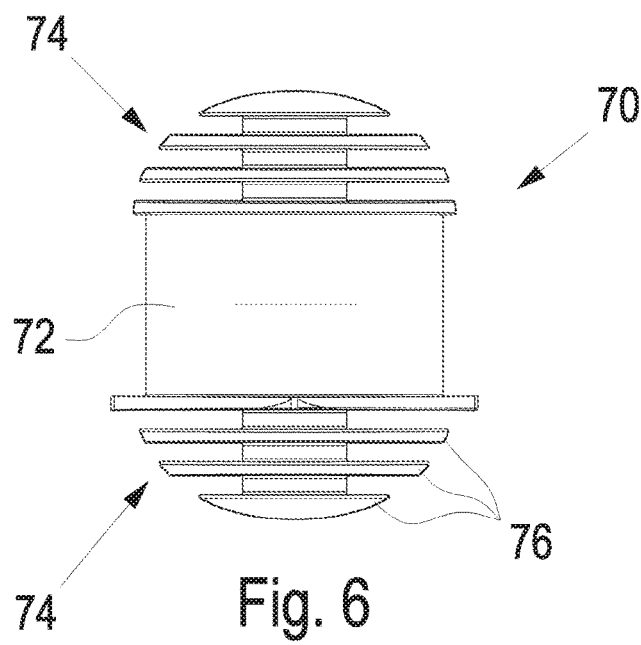
FIG. 6 is a schematic top plan view of an adapter element.
Figure 7:
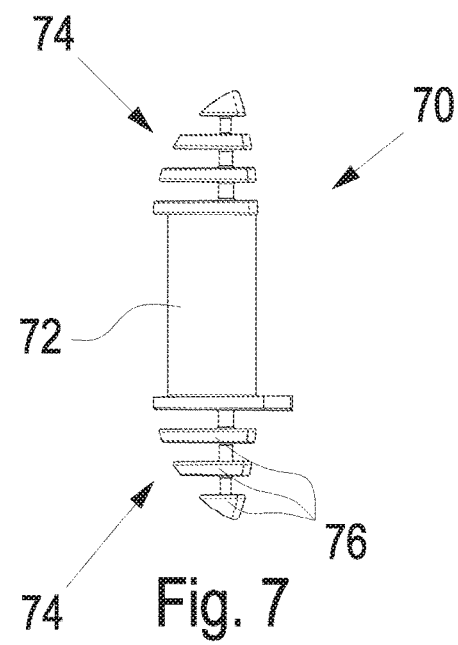
FIG. 7 is a schematic side view of the adapter element illustrated in FIG. 6.

FIGS. 5 to 7 illustrate a handlebar having a non-round outer contour in the region in which the clamping element 58 is arranged (FIG. 7). Since, in the embodiment illustrated, a clamping element is used which has a circular inner contour in the mounted state, an adapter element 70 (FIG. 7) according to a preferred embodiment of the invention is provided in this embodiment. The adapter element 70 completes the outer contour of the handlebar to form circular outer contour. Thus, it is possible to also use a clamping element 58 having a round inner contour on a non-round handlebar 56.

In the embodiment illustrated, the adapter element 70 comprises an inner part 72 and two adjoining outer parts 74. The inner part 72 has an outer contour that is segment-shaped, so that the same corresponds to the inner contour of the clamping element 58 or the second clamping part 20 (FIG. 5).

In the embodiment illustrated, the two outer parts 74 comprise a plurality of lamellae 75, so that a certain elasticity is given. Thus, the outer parts 74 can adapt to curved regions of the handlebar (see FIG. 3). In the embodiment illustrated, the lamellae 76 extend perpendicularly to the direction of deformation or vertically to the curvature of the handlebar.

The invention claimed is:

1. A clamping element for fastening a brake/gearshift lever unit to a bicycle handlebar, the clamping element comprising:
    a first clamping part adapted to be connected with the brake/gearshift lever unit, and
    a second clamping part releasably connected with the first clamping part,
    wherein the first clamping part and the second clamping part form a closed opening in which the handlebar is arranged in a mounted state, and
    wherein one of the first clamping part or the second clamping part comprises two lugs, each lug having a bolt hole for connection by bolts, said lugs engaging around an end part of the other of the first clamping part or the second clamping part, the end part having an opening which, for the insertion of a bolt, is in alignment with a respective one of the bolt holes.

2. The clamping element of claim 1, wherein the opening has a non-round inner contour.

3. The clamping element of claim 1, wherein the first clamping part comprises a connecting part for receiving a clamping member.

4. The clamping element of claim 1, wherein at least one of the first clamping part or the second clamping part is configured to be mirror-symmetrical in themselves.

5. The clamping element of claim 1, wherein the first clamping part or the second clamping part have two arms opposing each other, and wherein the two arms form at least one half of the opening.

6. The clamping element of claim 1, wherein the first and second clamping parts are connected with each other by two bolts.

7. The clamping element of claim 1, wherein the first and the second clamping parts are made of a high-strength material.

8. The clamping element of claim 1, wherein the first and the second clamping parts are made by laser sintering, wire erosion, CNC milling or MIM processes.

9. The clamping element of claim 1, wherein an adapter element is provided in the opening formed by the first and second clamping parts in the mounted state, the adapter element being provided for adapting the outer contour of the handlebar to the inner contour of the opening.

10. The clamping element of claim 9, wherein the adapter element is configured such that the adapter forms a circular outer contour together with the handlebar.

11. The clamping element of claim 9, wherein the adapter element has an inner part which in the mounted state is arranged completely inside the opening formed by the first and second clamping parts.

12. The clamping element of claim 11, wherein the adapter element has at least one elastically deformable outer part connected with the inner part, and wherein the outer part is arranged outside the opening formed by the first and second clamping parts in the mounted state.

13. The clamping element of claim 12, wherein the at least one outer part comprises a plurality of lamellae which in the mounted state extend perpendicularly to a direction of deformation.

14. A bicycle component for fastening to a bicycle handlebar comprising the clamping element of claim 1.

15. A clamping element for fastening a brake/gearshift lever unit to a bicycle handlebar, the clamping element comprising:
    a first clamping part adapted to be connected with the brake/gearshift lever unit, and
    a second clamping part releasably connected with the first clamping part,
    wherein the first clamping part and the second clamping part form a closed opening in which the handlebar is arranged in a mounted state,
    wherein an adapter element is provided in the opening formed by the first and second clamping parts in the mounted state, the adapter element being provided for adapting an outer contour of the handlebar to an inner contour of the opening,
    wherein the adapter element has an inner part which in the mounted state is arranged completely inside the opening formed by the first and second clamping parts, and
    wherein the adapter element has at least one elastically deformable outer part connected with the inner part, and wherein the outer part is arranged outside the opening formed by the first and second clamping parts in the mounted state.

16. The clamping element of claim 15, wherein the at least one outer part comprises a plurality of lamellae which in the mounted state extend perpendicularly to a direction of deformation.

* * * * *